United States Patent [19]

Hennessy

[11] 4,015,874
[45] Apr. 5, 1977

[54] RAILWAY AXLE END CAP SCREW LOCKING DEVICE

[75] Inventor: James J. Hennessy, Chambersburg, Pa.

[73] Assignee: Hennessy Products, Incorporated, Chambersburg, Pa.

[22] Filed: Sept. 9, 1975

[21] Appl. No.: 611,609

[52] U.S. Cl. .................. 295/36 R; 151/53
[51] Int. Cl.² ........................... F16B 39/02
[58] Field of Search ............ 295/36 R, 36 A, 43, 295/48; 301/108 S, 108 SC; 151/29, 60, 53, 52; 105/218

[56] References Cited

UNITED STATES PATENTS

| 981,284 | 1/1911 | Lamb | 151/53 |
| 1,562,907 | 11/1925 | Morgan | 151/53 |
| 3,523,709 | 8/1970 | Heggy et al. | 295/36 R |
| 3,623,761 | 11/1971 | Nadherny | 295/36 R |

FOREIGN PATENTS OR APPLICATIONS

| 59,483 | 1/1913 | Germany | 151/52 |

Primary Examiner—Robert B. Reeves
Assistant Examiner—H. Grant Skaggs
Attorney, Agent, or Firm—F. Travers Burgess

[57] ABSTRACT

A locking plate for the axle end cap screws of railway axles equipped with roller bearings is formed with an aperture positioned to accommodate a cap screw and at least one tab on the periphery of the plate near the cap screw aperture deformable into rotation-preventing engagement with the cap screw.

12 Claims, 14 Drawing Figures

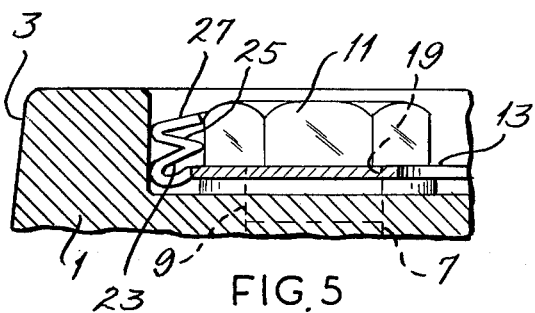
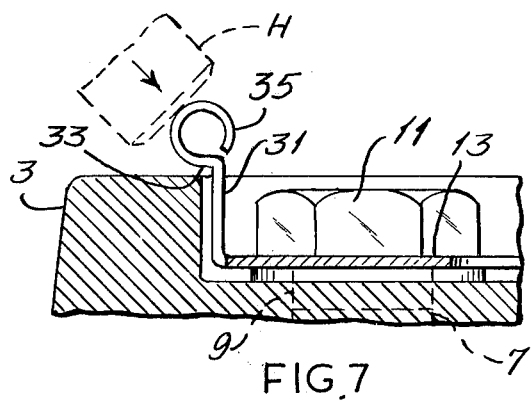
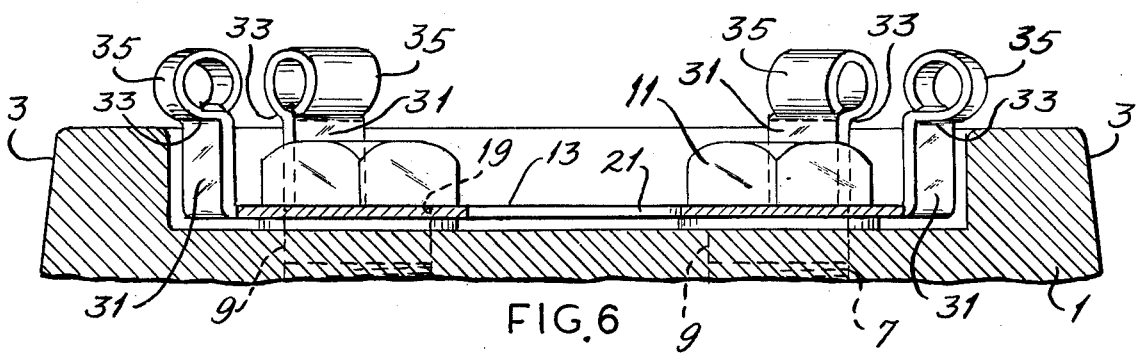
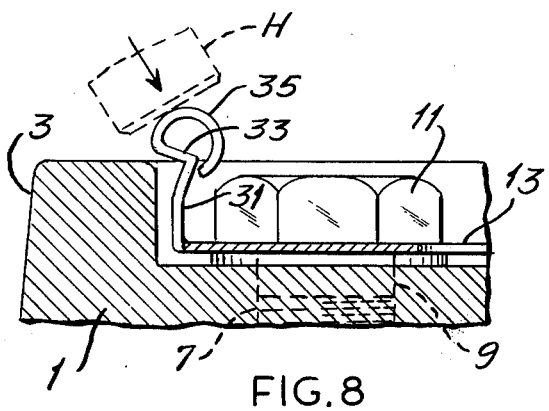
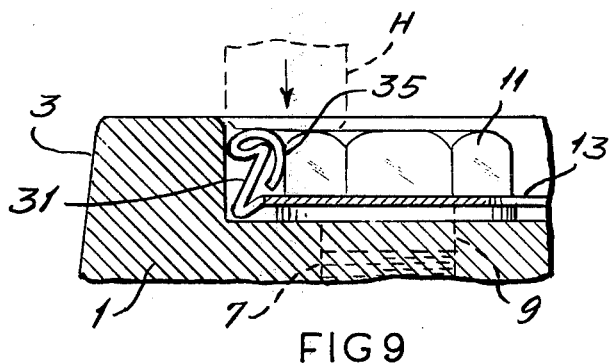
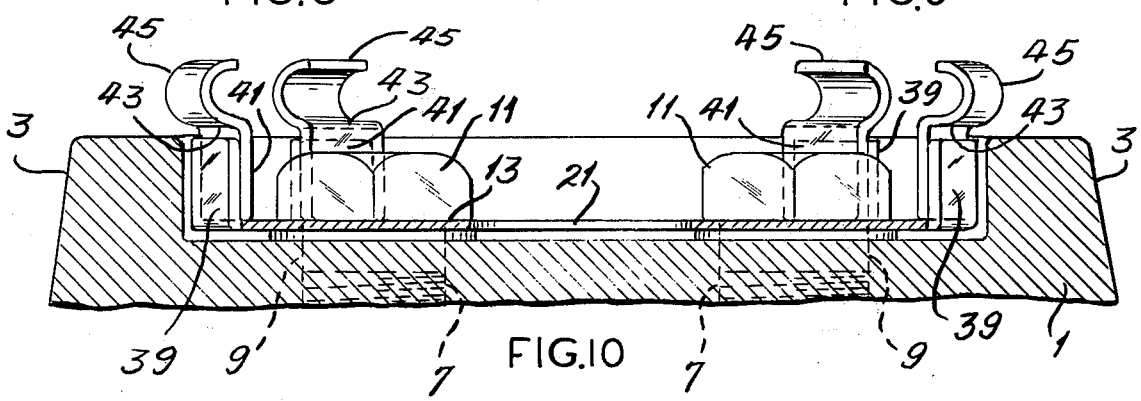

RAILWAY AXLE END CAP SCREW LOCKING DEVICE

BACKGROUND OF THE INVENTION

1. Field of the Invention

The invention relates to railway axles and consists particularly in locking plates for the end cap screws on roller bearing axles.

2. The Prior Art

The prior art includes a locking plate having apertures for three cap screws and formed with a pair of cap screw locking tabs lanced in the material of the plate adjacent each cap screw aperture so as to be bent upwardly and engage different faces of the cap screw head to prevent its turning. Looseness often results with this construction because of the impossibility of maintaining the tabs in tight engagement with the faces of the cap screw heads due to the tendency of the tabs to spring back from the head and also due to the fact that the faces of the cap screw head are frequently not parallel to the tab surface.

Another example of prior art utilizes a locking plate with upstanding tabs engageable with the inner and upper surfaces of the three cap screw heads and secured to the axle end by a hexagonal head grease fitting, the lubricating fitting head being adapted to act through the metal of the locking plate to force the tabs into overlying and abutting engagement with the three cap screw heads.

In another embodiment of the same invention the locking plate is formed with three wedge-shaped arms having serrated edges engageable with faces or angles of the cap screw heads to prevent their rotation.

A third embodiment of the same invention includes a combination of radial arms and radial tabs having flat upright surfaces centrally indented for engagement with either faces or angles of the cap screw heads.

Another example of prior art utilizes a pair of plates one of which is formed with three circular apertures to receive the shanks of the cap screws and the second of which is formed with three serrated generally circular apertures the serrations of which are adapted to engage faces and angles of the cap screws and prevent their rotation. The first plate is secured to the axle cap by means of the cap screw heads which overlie it and is formed with three outwardly projecting tabs bendable over the second plate to retain the second plate in locking position.

A further example of prior art shows a locking plate having suitably spaced circular apertures to receive the shanks of the cap screws with the middle of the locking plate being removed and there being a pair of tabs extending inwardly from the regions surrounding each cap screw aperture and bendable upwardly to engage faces of the cap screw. This construction, like the first-named construction, has the disadvantage that it is impossible to maintain the tabs in tight engagement with the cap screw faces.

In yet another example of prior art, individual locking plates for each cap screw are superimposed upon the plate described immediately previously and are held thereon by rebending the tabs flat into engagement with the rim of the individual plates and the individual plates are partly serrated for engagement with the cap screw head faces and angles and are formed with a tail portion engageable with the axle cap rim to prevent loosening rotation of the individual cap screws.

SUMMARY OF THE INVENTION

The invention provides a locking plate for railway axle roller bearing end cap screws having locking tabs on their peripheral surfaces deformable into tight fitting engagement with the outer faces of the cap screw heads and the inner surface of the axle cap upstanding rims such that the elasticity of the metal and its tendency to return to its original configuration will cause it to fill the gap and maintain the cap screw heads in tight unrotated positions.

Advantages of the locking plates constructed according to the invention include the following:

Positive locking is effected because of the natural tendency (elasticity) of steel to return to its undeformed condition and thereby expand in the cavity defined by the inner surface of the cap rim and the opposing side faces of the cap screw.

Tight locking engagement is achieved even though a tab is opposite an angle of the cap screw head rather than parallel to a face of the head because the tab can be hammered into the space between the end cap rim and the cap screw head whereby the point of the cap screw digs into the metal of the tab to form a tight lock.

The respective angular disposition of the tab adjacent each cap screw assures that even though one of the tabs may be in radial alignment with an angle of the cap screw head, the other tab will achieve substantial purchase on one face of the cap screw head.

Simplicity and economy of construction is achieved by the fact that only a single locking plate is required if a unitary plate is provided for all three cap screws and only a single plate for each screw is required if individual plates are provided for each cap screw.

BRIEF DESCRIPTION OF THE DRAWINGS

FIG. 5 corresponds to FIGS. 3 and 4 but shows the tab fully deformed into cap screw locking condition.

FIG. 6 is a sectional view corresponding to FIG. 2 but showing a modified form of the invention in which the locking tabs are of different shape.

FIGS. 7, 8 and 9 correspond to FIGS. 3, 4 and 5 but show the various steps in the deformation to locking condition of tabs of the type illustrated in FIG. 6.

FIG. 10 is a sectional view corresponding to FIG. 2 but showing tabs which are separate from and welded to stubs on the plate rather than being integral with the locking plate.

DETAILED DESCRIPTION OF THE INVENTION

Figure 1:
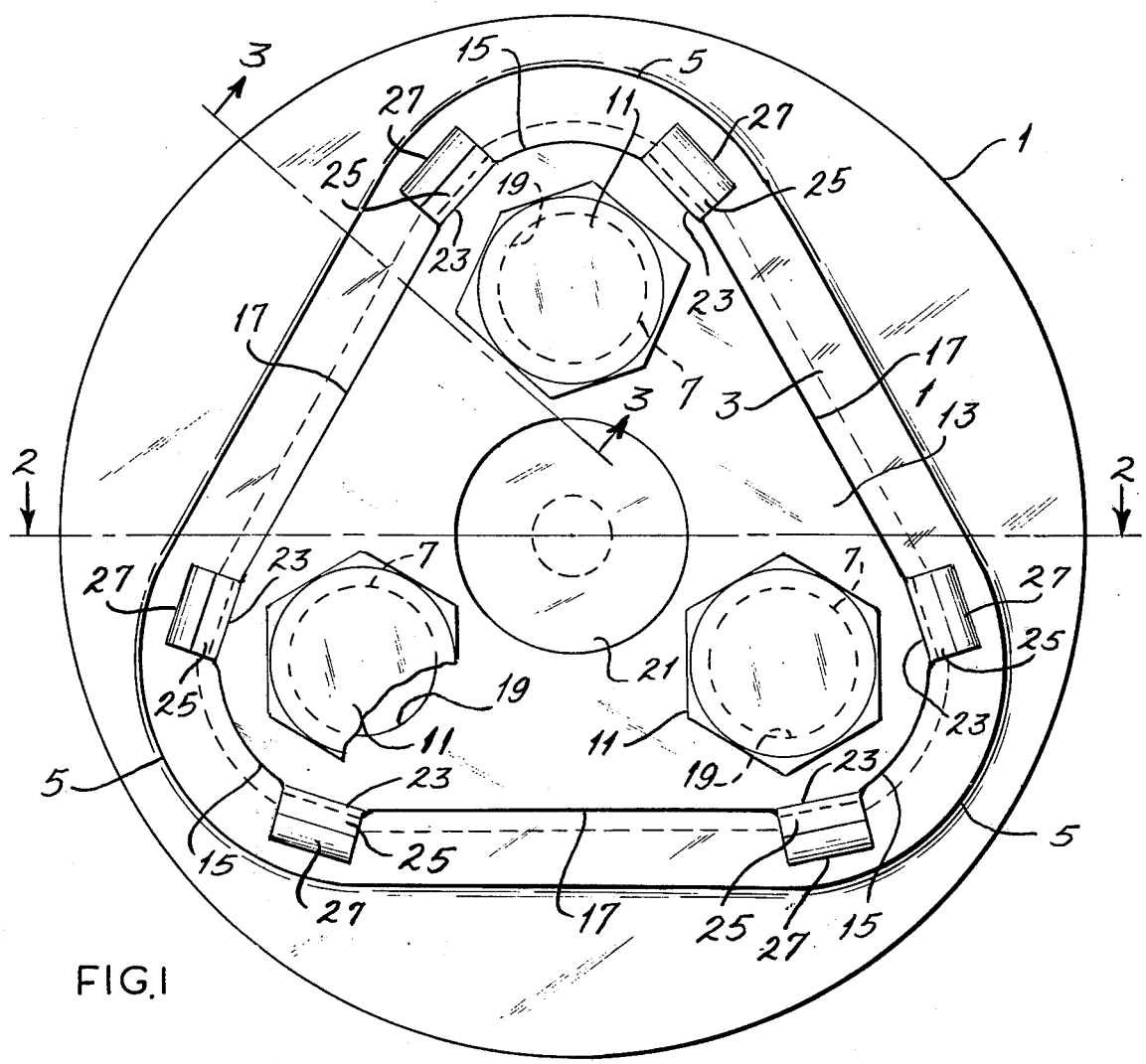
FIG. 1 is an elevational view of an end cap locking plate constructed according to the invention, showing its application to an end cap prior to locking of the cap screws.
Figure 2:
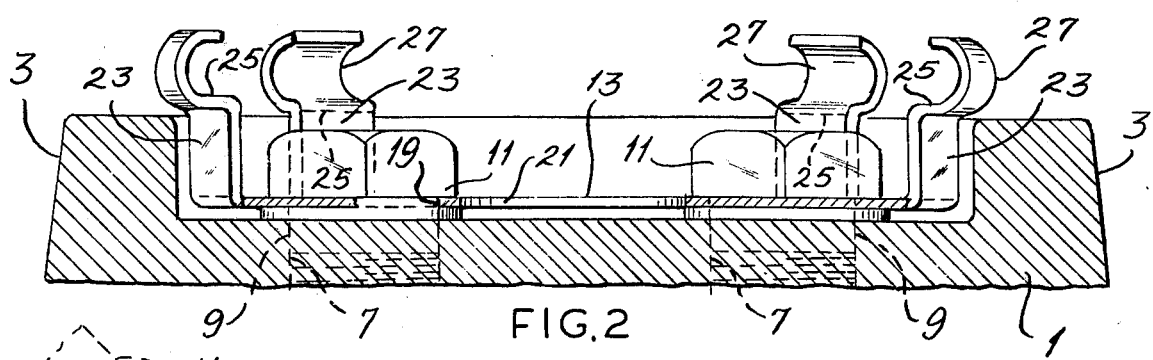
FIG. 2 is a transverse sectional view taken along line 2—2 of FIG. 1.

The numeral 1 indicates a railway roller bearing axle end cap formed with a generally triangular upstanding rim 3 having arcuate corner portions 5 and apertured adjacent each corner as at 7 to permit the passage therethrough of the shank portion 9 of cap screws each having a hexagonal head 11 for securing the axle end cap 1 to the end surface of the axle.

For preventing undesired rotation of cap screws 9, 11 from their secured positions, a metal plate 13 of generally triangular shape with rounded corners 15 and straight sides 17 conformed generally to the shape of end cap rim 3 but being slightly smaller than the inside dimensions of the latter is similarly formed with circular apertures 19 in each of its corners to receive the shanks of the cap screws and is circularly apertured at its center at 21 to accommodate a lubrication fitting (not shown) at the center of the end cap.

Adjacent the points of tangency of the curved apices 15 of plate 13 with straight sides 17 thereof are formed upstanding tabs 23 the upper portions of which are bent radially outwardly at 25 and the terminals of which are curved upwardly and inwardly as at 27 in semicylindrical configuration.

Prior to application of the end caps to the axle ends, locking plates are positioned in the space bounded by rim 3 of the end cap, cap screws are inserted through the registering apertures 19 and 7 and screwed into the threaded cap screw holes (not shown) in the axle end until the end cap is tightly secured to the axle end.

Figures 3, 4:
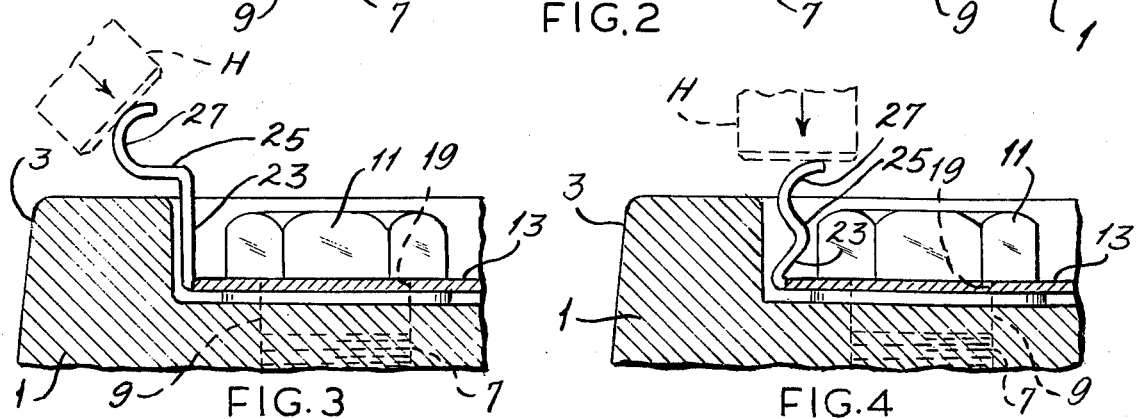
FIG. 3 is a fragmentary view taken from line 3—3 of FIG. 1 showing the first step in deformation of a tab into locking engagement between a cap screw head and the axle end cap rim.
FIG. 4 is a view corresponding to FIG. 3 but showing the tab partially deformed toward locking configuration.

A hammer is then utilized in the manner shown in FIGS. 3 and 4 to deform tabs 23, 25, 27 into the condition shown in FIG. 5 wherein they fully occupy the space between each of the cap screw sides of angles and the inner surface of the end cap rim 3 thereby locking the cap screw heads against rotation.

The embodiment shown in FIGS. 6-9 is identical to that illustrated in FIGS. 1-5 except for the shape of tabs 31, the upper portions of which are similarly rebent radially outwardly at 33 and then rebent upwardly and inwardly and downwardly to form a substantially full circular upper terminal 35.

In FIGS. 7, 8 and 9 the steps of deforming tabs 31, 33, 35 by use of a hammer H into locking position of FIG. 9 are shown.

The embodiment of FIG. 10 utilizes short radial stubs 39 which are bent upwardly and separate tabs having an upstanding straight lower portion 41 bent radially outwardly at 43 and upwardly and inwardly in semicircular configuration at 45, the upstanding portion 41 being welded to stubs 39. This construction may be utilized to conserve the extra amount of metal which would be wasted if the full length tabs were integral with the locking plate. It will be understood that the separate tabs may be of any desired configuration such as the semicircular type of FIGS. 1-5 or the substantially fully circular type of FIGS. 6-9.

Figure 11:
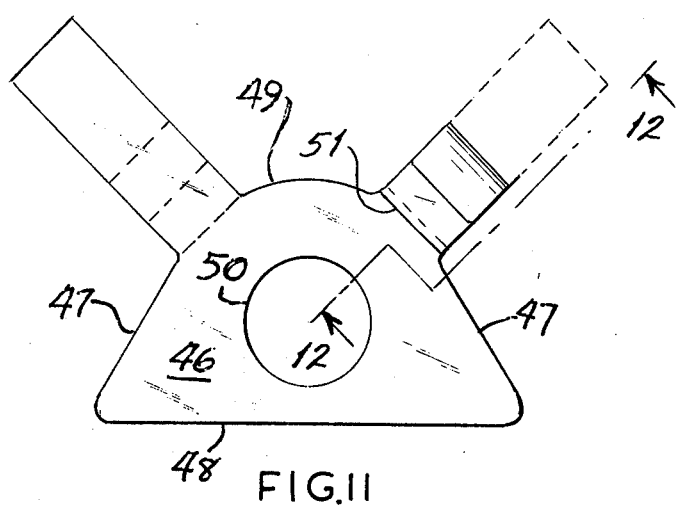
FIG. 11 is an elevational view of an individual locking plate for one cap screw.
Figure 12:
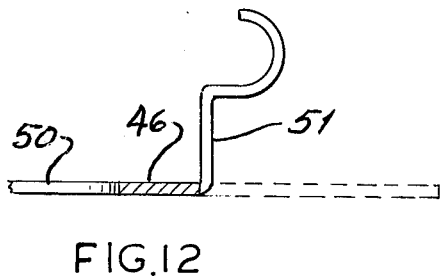
FIG. 12 is a view taken along line 12—12 of FIG. 11 showing the tab construction.

The embodiment of FIGS. 11 and 12 utilizes a small individual locking plate 46 for each cap screw, rather than a large plate arranged for locking engagement with all three cap screws. Plate 46 has a pair of short angularly disposed sides 47 connected at their remotely spaced ends by a long straight side 48 and at their closely spaced ends by an arcuate edge 49. A central hole 50 is formed for the cap screw shanks to pass through, and a pair of radial tabs 51, similar to those shown in FIGS. 1-5, extend upwardly from the periphery of plate 46 between side 47 and arcuate edge 49. The plates are positioned in the corners of the end cap with sides 47 parallel to rim 5, screws 11 inserted through holes 50 and tabs 51 hammered down between the screw heads and rim 5 as shown in FIGS. 3-5. Rotation of the individual plate with respect to the end cap rim, as well as rotation of the individual screw with respect to the plate is accomplished by engagement of the tabs with at least one face and one angle of the screw heads and the inner surfaces of the end cap rims.

Figure 13:
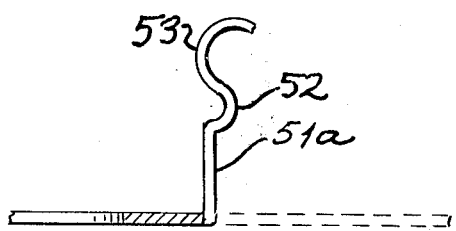
FIGS. 13 and 14 show two additional tab configurations applicable to any of the embodiments illustrated in FIGS. 1–12.

FIG. 13 illustrates another form of tab 51a, applicable to three-screw locking plates of FIGS. 1-10 or to the single-screw locking plates of FIGS. 11-12, in which the upper portion is curved first outwardly at 52 in a substantial semicircle and then reverse curved upwardly and inwardly at 53 in a larger semicircle to form a generally "S" shaped upper portion.

Figure 14:
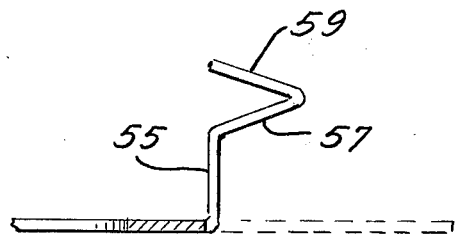

In FIG. 14 tab 55 is bent obliquely outwardly at 57 and then obliquely inwardly at 59 to form a "V" shaped terminal. This tab configuration is equally applicable to the three-screw or single-screw locking plates.

The invention may be modified in various respects as will occur to those skilled in the art and the exclusive use of all modifications coming within the scope of the appended claims is contemplated.

I claim:

1. A locking device for a railway axle end cap screw having a polygonal head, comprising a plate having a circular aperture of sufficient size to accommodate the shank of the screw and a peripheral edge spaced radially from said aperture and shaped for anti-rotational relation with the inner surface of the adjacent portion of the end cap rim, and a pair of plate-like tabs substantially normal to the plane of said plate on said peripheral edge of said plate and intersecting said plate on normals to radii of said aperture, said tabs being wholly spaced radially from the center of said aperture a greater distance than the maximum radius of the cap screw head whereby to provide sufficient clearance for rotation of the cap screw into end cap securing position and being of substantially greater length than the thickness of the head of said cap screw and having their ends remote from said plate preformed to facilitate forcibly folding said tabs into the space between the polygonal head of the cap screw and the end cap rim whereby through engagement with the rim and the cap screw head at locations spaced circumferentially thereof, to prevent undesired rotation and loosening of the screw.

2. A locking device according to claim 1 wherein said plate has an inner peripheral edge in spaced but proximate relation with said circular aperture.

3. A locking device according to claim 2 wherein the lower portion of each of said tabs is substantially normal to said plate and the upper portion is bent outwardly away from said plate and has its terminal curved upwardly and inwardly.

4. A locking device according to claim 2 wherein the lower portion of each of said tabs is substantially normal to said plate and the upper portion is of S-configuration.

5. A locking device according to claim 2 wherein the lower portion of each of said tabs is substantially normal to said plate and the upper portion is of V-configuration.

6. A locking device for the hexagonal-headed end cap screws of railway axles comprising an equilaterally triangular plate having rounded corners concentric with the screw centers and substantially tangent to the adjacent sides of the plate, circular openings in the plate of sufficient size and positioned to accommodate the shanks of the screws, and upstanding plate-like tabs on the periphery of the plate adjacent the respective points of tangency of the rounded corners and sides of the plate and intersecting said plate on normal to radii of the respective screw openings, said tabs being preformed to facilitate forcibly folding them downwardly to occupy the space between the hexagonal heads of the respective screws and the upstanding peripheral rim of the axle end cap and by engagement with the rim and the respective screw heads at locations spaced apart circumferentially thereof preventing undesired rotation and loosening of the screws.

7. A locking device according to claim 6 wherein the lower portion of said tabs are substantially normal to the plane of said plate and the upper portions are bent radially outwardly with their terminals curved upwardly and inwardly to form substantially semicircles.

8. A locking device according to claim 6 wherein the lower portions of said tabs are substantially normal to the plane of said plate and the upper portions are bent radially outwardly with their terminals curved upwardly, inwardly and downwardly to form substantially full circles.

9. A locking device according to claim 6 wherein the lower portion of each of said tabs is substantially normal to said plate and the upper portion is of S-configuration.

10. A locking device according to claim 6 wherein the lower portion of each of said tabs is substantially normal to said plate and the upper portion is of V-configuration.

11. A locking device according to claim 6 wherein said tabs are integral with said plate.

12. A locking device according to claim 6 wherein said plate is formed with upwardly bent radial stubs and separate tabs are lapped against said stubs and welded thereto.

* * * * *